United States Patent
Ciszewski et al.

(10) Patent No.: US 10,061,684 B2
(45) Date of Patent: Aug. 28, 2018

(54) ENHANCED SERVICE VALIDATION

(71) Applicant: Microsoft Technology Licensing, LLC, Redmond, WA (US)

(72) Inventors: Piotr A. Ciszewski, Kirkland, WA (US); Daulet Zhanguzin, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 185 days.

(21) Appl. No.: 14/815,253

(22) Filed: Jul. 31, 2015

(65) Prior Publication Data

US 2017/0031804 A1     Feb. 2, 2017

(51) Int. Cl.
*G06F 9/44* (2018.01)
*G06F 11/36* (2006.01)
*H04L 29/08* (2006.01)

(52) U.S. Cl.
CPC ...... *G06F 11/3664* (2013.01); *G06F 11/3692* (2013.01); *G06F 11/3696* (2013.01); *H04L 67/02* (2013.01); *H04L 67/1095* (2013.01); *H04L 67/125* (2013.01); *H04L 67/22* (2013.01)

(58) Field of Classification Search
CPC ............ G06F 11/3692; G06F 17/5009; G06F 11/3664; G06F 9/455; G06F 11/3476; G06F 11/3668; G06F 2201/865; G06F 3/065; G06F 11/1453; G06F 17/30575; G06F 12/0868; G06F 2212/151
See application file for complete search history.

(56) References Cited

U.S. PATENT DOCUMENTS

| | | | |
|---|---|---|---|
| 7,171,662 B1 | 1/2007 | Misra et al. | |
| 7,613,749 B2* | 11/2009 | Flynn, Jr. | ............ G06F 11/1662 |
| 8,707,287 B2* | 4/2014 | Raundahl Gregersen | |
| | | | ............................ G06F 8/656 |
| | | | 717/168 |
| 8,925,110 B2 | 12/2014 | Li et al. | |
| 8,990,778 B1* | 3/2015 | Allocca | ............... G06F 11/3692 |
| | | | 717/126 |
| 9,058,428 B1* | 6/2015 | Siddiqui | ............. G06F 11/3688 |
| 9,329,985 B1* | 5/2016 | Stern | ................... G06F 11/3692 |

(Continued)

OTHER PUBLICATIONS

David Lie et al.; Architectural Support for Copy and Tamper Resistant Software; 2000 ACM; pp. 168-177; <https://dl.acm.org/citation.cfm?id=357005>.*

(Continued)

*Primary Examiner* — Thuy Dao
*Assistant Examiner* — Cuong V Luu

(57) ABSTRACT

Technology is disclosed herein for validating a new version of a service running in parallel with a previous version of the service. In a validation environment, traffic is duplicated traffic that is inbound to the previous version of the service, for consumption in parallel by the new version of the service. In response to write operations that are prompted by the traffic, the previous version of the service is provided with regular access to the data while the new version of the service is provided with emulated write-access to the data. The non-validated replies to the traffic generated by the new version of the service are then evaluated against expected replies to the traffic generated by the previous version of the service, to identify flaws in the new version of the service.

15 Claims, 6 Drawing Sheets

(56) References Cited

U.S. PATENT DOCUMENTS

| | | | |
|---|---|---|---|
| 2002/0107809 A1 | 8/2002 | Biddle et al. | |
| 2003/0126456 A1 | 7/2003 | Birzer et al. | |
| 2005/0071276 A1 | 3/2005 | Bruchlos et al. | |
| 2006/0174155 A1* | 8/2006 | Mansell | G06F 11/3696 714/5.11 |
| 2007/0244937 A1* | 10/2007 | Flynn, Jr. | G06F 11/1662 |
| 2008/0282317 A1 | 11/2008 | Nam | |
| 2008/0301663 A1* | 12/2008 | Bahat | G06F 8/656 717/170 |
| 2009/0037287 A1 | 2/2009 | Baitalmal et al. | |
| 2010/0042985 A1* | 2/2010 | Ichikawa | G06F 8/44 717/170 |
| 2010/0131928 A1* | 5/2010 | Parthasarathy | G06F 11/3664 717/126 |
| 2011/0213713 A1 | 9/2011 | Ferris et al. | |
| 2011/0213719 A1 | 9/2011 | Ferris et al. | |
| 2012/0159425 A1* | 6/2012 | Shukla | G06F 8/71 717/104 |
| 2012/0216269 A1 | 8/2012 | Yeung et al. | |
| 2012/0311656 A1 | 12/2012 | Hohlfeld et al. | |
| 2013/0198085 A1 | 8/2013 | Li et al. | |
| 2013/0198852 A1 | 8/2013 | Li et al. | |
| 2015/0286556 A1* | 10/2015 | Ellis | G06F 11/3684 717/125 |

OTHER PUBLICATIONS

J. Voas et al.; Software Testability: An Simulation Experiment in Measuring Simulation Reusability; 1995 ACM; pp. 247-255; <https://dl.acm.org/citation.cfm?id=211854>.*

Keith Adams et al.; A Comparison of Software and Hardware Techniques for x86 Virtualization; 2006 ACM; pp. 2-13; <https://dl.acm.org/citation.cfm?id=1168860>.*

Yu-Yuan Chen et al.; A Software-Hardware Architecture for Self-Protecting Data; 2012 ACM; pp. 14-27; <https://dl.acm.org/citation.cfm?id=2382201>.*

David Lie et al.; Specifying and Verifying Hardware for Tamper-Resistant Software; 2003 IEEE; 12 pages; <https://ieeexplore.ieee.org/stamp/stamp.jsp?tp=&arnumber=1199335>.*

Tien-Fu Chen et al.; A Performance Study of Software and Hardware Data Prefetching Schemes; 1994 IEEE; pp. 223-232; <https://ieeexplore.ieee.org/stamp/stamp.jsp?tp=&arnumber=288147>.*

"Software License Optimization", Published on: Oct. 1, 2014, Available at: http://www.flexerasoftware.com/enterprise/products/software-license-management/.

"Software Licensing the Modern Way—in the Cloud", Published on: Mar. 27, 2014, Available at: http://www.nalpeiron.com/downloads/nalpeiron_brochure.pdf.

* cited by examiner

ENHANCED SERVICE VALIDATION

TECHNICAL BACKGROUND

Shadowing is a technique employed in software development fields to test a new version of a service. When shadowing is implemented, both a previous version of the service that is live and the new version of the service run in parallel. As both versions process incoming traffic, their responses to the traffic are evaluated in parallel to detect any potential flaws in the coding, design, and operation of the new version of the service.

One drawback to shadowing relates to maintaining proper state in the data that the new version of the service processes. Shadowing typically involves creating a copy of the data used by the previous version of the service. The new version of the service can then operate on the copy of the data. However, flaws in the new version of the service may lead the copy of the data to take on erroneous states as the new version writes to it. The state errors may render the evaluation of the new version's responses ineffective and possibly misleading. Synchronizing the data between the two versions of the service can alleviate this problem for short periods of time, but new state discrepancies can occur almost immediately when the new version of the service continues to write to the data.

Another problem may occur with respect to interfacing with external services. Some external services, such as a key service that manages license keys, are limited in the sense that they cannot be copied or duplicated for shadowing purposes. Thus, a new version of a licensing service cannot interface with the key service that supports a previous (live) version of the licensing service without disrupting the live service.

OVERVIEW

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

Technology is disclosed herein that enhances shadowing technology to better validate new versions of services. In an implementation, write access to service data is emulated, such that when a new version of a service performs a write operation, the data is not impacted. In some implementations, state changes in the data may be updated from the original copy of the data associated with a previous version of the service to the new version. In addition, emulators to external services may also be provided in some implementations.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Service validation technology is disclosed herein that enhances the validation process for new versions of software services. In various implementations, traffic that is inbound to a service is duplicated and sent to a new version of the service. The new version of the service may process the traffic in parallel with the previous version of the service, such that the responses to the traffic generated by both versions may be evaluated.

However, to mitigate at least some of the problems associated with service shadowing, access to service data is emulated such that write operations initiated by the new version of the service do not affect state. In the background, the base copy of the service data maintained by the previous version of the service may be synchronized with the copy accessed by the new version of the service. In this manner, the service data will be current with respect to state and the new version's responses can be trusted for validation purposes. Access to an external service may also be emulated in some implementations.

Figure 1:
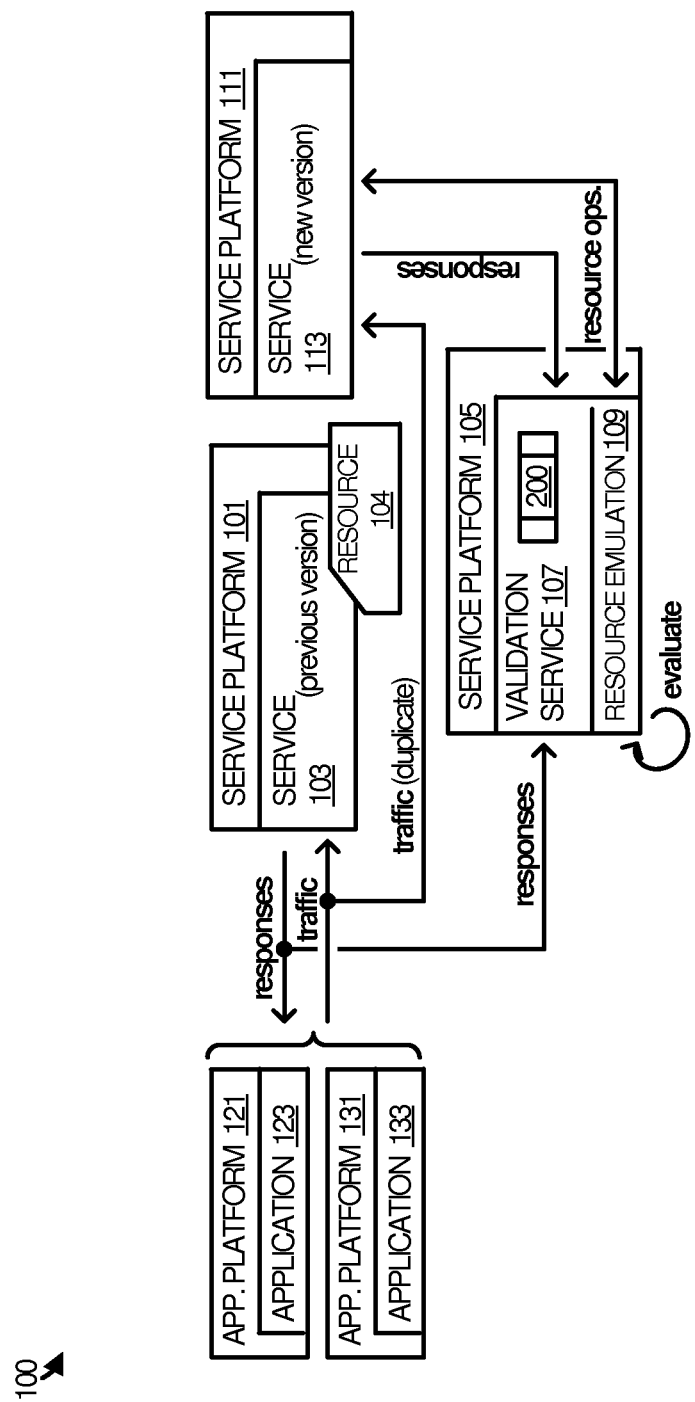
FIG. 1 illustrates a validation environment in an implementation.

Referring now to the drawings, FIG. 1 illustrates an exemplary validation environment 100 and an operational scenario in an implementation. Validation environment 100 includes service platform 101 that hosts service 103. Service platform 111 hosts service 113 and service platform 105 hosts validation service 107. While shown as hosted on separate platforms, it may be appreciated that one or more of service 103, service 113, and validation service 107 could be hosted on the same service platform.

Validation environment 100 also includes application platform 121 and application platform 131. Application platform 121 hosts application 123 and application platform 131 hosts application 133. Application 123 and application 133 may also be hosted on a single application platform if desired.

Figure 6:
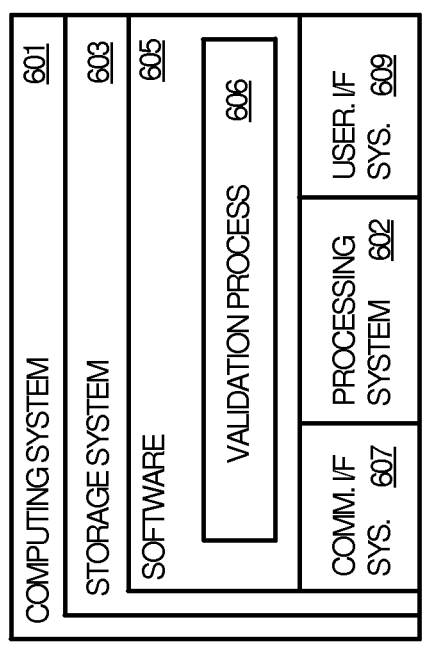
FIG. 6 illustrates a computing system suitable for implementing the enhanced service validation technology disclosed herein, including any of the environments, architectures, elements, processes, and operational scenarios and sequences illustrated in the Figures and discussed below in the Technical Disclosure.

Service 103 may be representative of any software application or collection of applications that provide a service to another application. The service may be a support service, such as a licensing service, or may be a primary service, such as a productivity service. Examples of service 103 include, but are not limited to, licensing services, financial services, productivity services, gaming services, personal information management services, and any other type of service, combination of services, or variation thereof. Examples of service platform 101 include physical and virtual server computers and other suitable computing devices, of which computing system 601 in FIG. 6 is representative.

Application 123 and application 133 are each representative of any application that may communicate with a service, such as service 103. Application 123 and application 133 may be stand-alone applications or may be part of a collection of applications that provide a service to still other applications. Examples of application platform 121 and application platform 131 also include physical and virtual server computers, although end-user devices are also possible, such as laptop computers, desktop computers, tablet computers, mobile phones, wearable devices, and any other type of computing device, of which computing system 601 is representative.

Validation service 107 is representative of service capable of employing a validation process as described herein. Validation service 107 may be implemented in software executable on service platform 105 or another suitable physical or virtual computing device, of which computing system 601 is representative. Validation service 107 may be implemented as a stand-alone solution or may be integrated with other services or applications. Validation service 107 may also be implemented in a distributed fashion across other services or applications.

Figure 2:
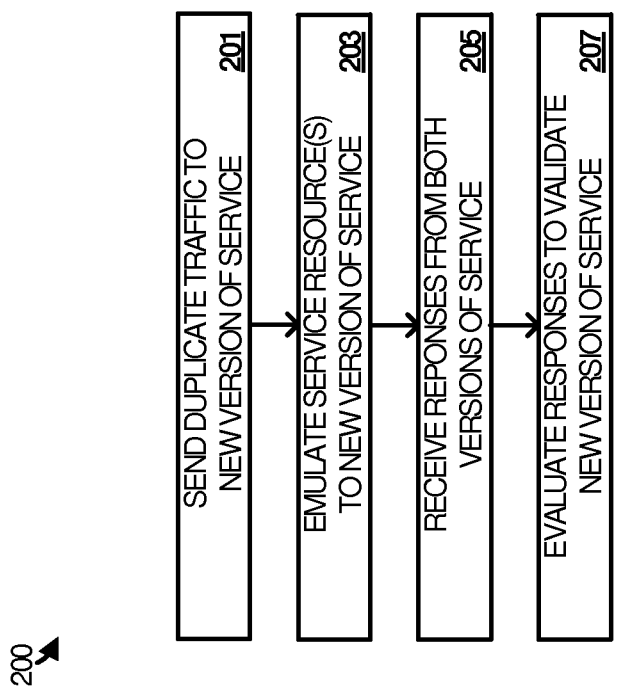
FIG. 2 illustrates a validation process in an implementation.

Validation service 107 employs validation process 200, which is representative of a software module, component, or collection thereof capable of implementing the functionality illustrated in FIG. 2. The following operational discussion therefore makes reference to steps illustrated in FIG. 2.

In operation, traffic is generated by one or more of applications 123 and 133. The traffic is communicated to service 103. The traffic is also duplicated (step 201) and communicated to service 113 for processing in parallel. Duplicating the traffic may involve copying live traffic and sending the copied traffic to service 113 at substantially the same time as the original traffic. However, the traffic could also be copied, saved, and sent on to service 113 at a later time, rather than at the same time. In addition, while the traffic is shown as forking prior to arriving at either service 103 or validation service 107, the step of duplicating cold be carried out in either service 103, validation service 107, or elsewhere.

Service 113 may be considered a new version of a service, while service 103 may be considered the previous version of the service, although other distinctions are possible so long as the services are different versions relative to each other. For example, service 113 could be an older version of service 103, not a new version. Service 103 and service 113 process the traffic in parallel relative to each other and generate responses that are directed to validation service 107. In some implementations, the traffic may not be processed parallel, but rather processed by one service at a later time or asynchronously relative to the other service. In the context of processing the traffic, service 103 may access resource 104. For example, service 103 may read or write data to or from resource 104 or may request other information from resource 104. However, to prevent service 113 from accessing resource 104 (or a copy thereof), resource emulation 109 is provided by validation service 107 (step 203).

Resource emulation 109 allows service 113 to interact with resource emulation 109 to perform at least some resource operations, without impacting the actual resources. For other resource operations, service 113 may interact with another instance of resource 104 or with resource 104 directly. Service 113 accesses resource emulation 109 to read or write data, for example, or to obtain a license key in another example. Such data may then be processed by service 113 in accordance with its logic to produce the responses that are evaluated by validation service 107. While shown as integrated with validation service 107, resource emulation 109 could be provided by some other element, such as by service 113, as a stand-alone implementation, or the like.

Validation service 107 receives the responses from both service 103 and service 113 (step 205) and evaluates the responses to determine whether or not to validate service 113 (step 207). For instance, if the responses match, then it that portion of the new version of the service may be considered valid or ready. If the responses do not match, then that portion of the new version of the service may have a bug or require other troubleshooting. Other behavior that can be evaluated includes monitoring how long it takes for one or the other service to process and/or respond. Even the lack of a response, which may occur in some scenarios, is a behavior to be evaluated. Other performance metrics could be measured and evaluated and may be considered within the scope of the disclosure. Once service 113 has been validated, live traffic can be directed to it, rather than to service 103.

Figure 3:
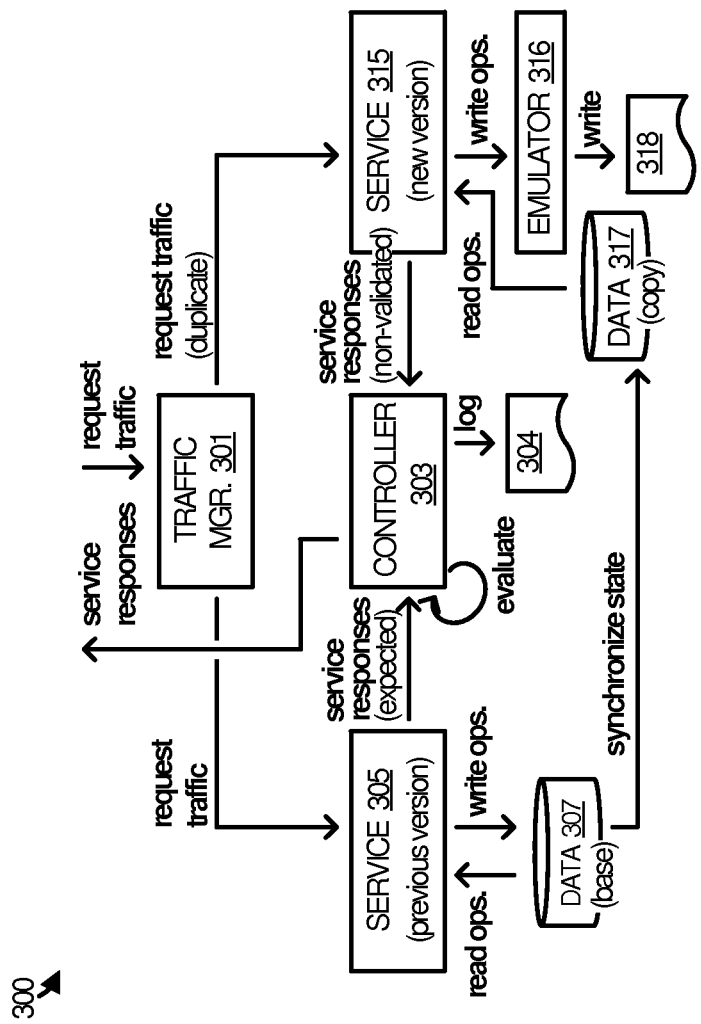
FIG. 3 illustrates a validation environment in an implementation.

FIG. 3 illustrates another validation environment 300 and an operational scenario in an implementation. The elements of validation environment 300 may be implemented in software, on a suitable computing device or devices, of which computing system 601 is representative. Validation environment 300 includes traffic manager 301, controller 303, service 305, and service 315.

In operation, request traffic is received into traffic manager 301. The request traffic may originate from end-user devices, intermediate systems (such as other application services), or elsewhere, and are directed to service 305 to request information, action, or some other aspect of a service. Service 305 may be considered a previous version of a service relative to service 315, which is the new version of the service. Traffic manager duplicates the traffic and sends the duplicate stream to service 315.

Service 305 and service 315 proceed to process the traffic substantially in parallel. Service 305 may perform read operations, write operations, or both, with respect to data 307. Data 307 is a base copy of data used to support the service. In the background, data 307 is synchronized with data 317. To synchronize, the state changes that occur with respect to data 307 are copied to data 317 to update its state. Data 317 need not be an exact replica of data 307. Rather, the storage technology used to store data 317 may differ relative to data 307. The format, protocol, or other such characteristics of data 317 may also differ relative to data 307. For instance, one may be a MySQL database while another is MongoDB. In fact, some data transformations may be applied in some scenarios, such as when one service understands a broader set of relations (a.k.a. Object Model) than the other service. For example, service 305 may only allow one user under a subscription, while service 315 may allow multiple users under a subscription.

Service 315 may perform read operations with respect to data 317, which is a copy of data 307. However, when attempting to write to data 317, service 315 instead communicates with emulator 316. Emulator 316 presents an emulated version of data 317 to service 315 for write purposes. Data is written to temporary storage 318.

Service 305 communicates its expected service responses to controller 303, while service 315 also communicates its (non-validated) service responses to controller 303. Controller 303 then evaluates the responses to determine whether or not to validate one or more portions of service 315. The expected service responses may be communicated by controller 303 back to the source of the traffic requests. Optionally, service 305 may communicate the service responses to the source. The responses may optionally be returned through traffic manager 301.

Figure 4:
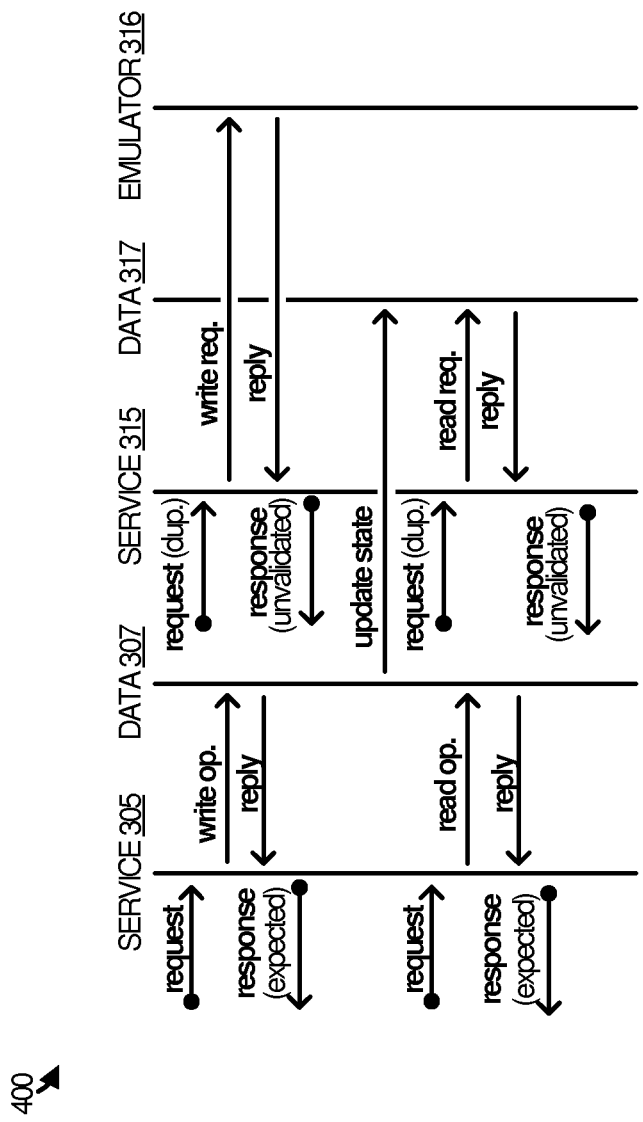
FIG. 4 illustrates a validation scenario in an implementation.

FIG. 4 illustrates an operational sequence 400 to better demonstrate various aspects of enhanced service validation. In operation, service 305 receives a request from an upstream service application or client application. The request is duplicated and communicated to service 315.

Service 305 performs a write operation in response to the requests and receives a reply in return (an acknowledgment, for example). At approximately the same time, service 315 also initiates a write requests, but to emulator 316. Service 315 may also receive a reply to the write request. Service 305 returns its expected reply (to a validation system, for example) and service 315 returns its non-validated reply.

As the state of data 307 has changed due to the write performed by service 305, data 317 is updated with the same state change to keep it synchronized with data 307. Such synchronization is needed to ensure that later read operations are not reading bad data.

Accordingly, service 305 may receive another request from a service application or a client application. Service 305 performs a read operation to obtain the requested data and returns an expected response with the data.

Service 315 receives the same request (duplicate) and performs a read request on data 317. Because data 317 had been updated with the state change, it is able to return data without any concern that data 317 is out of synch with data 307. Service 315 returns its non-validated response to the validation system for evaluating against the response provided by service 305.

Figure 5:
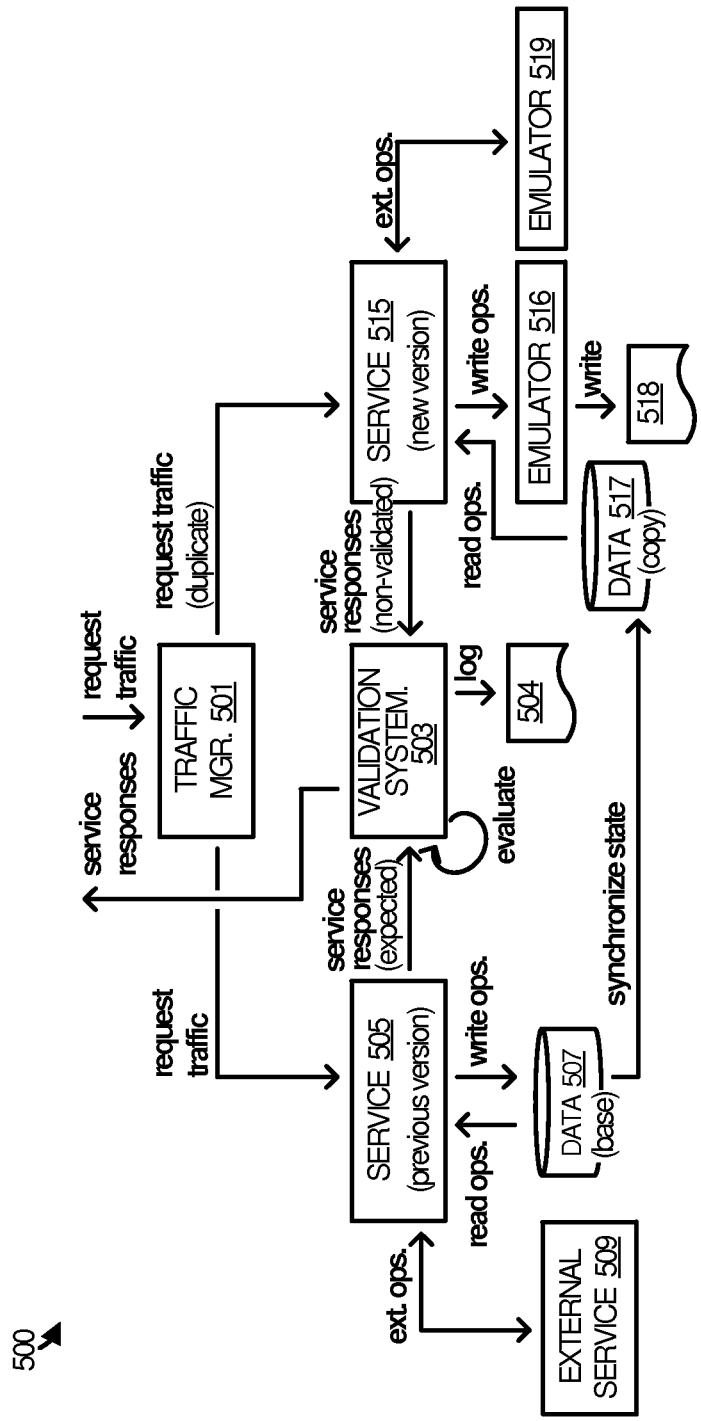
FIG. 5 illustrates a validation environment in an implementation.

FIG. 5 illustrates yet another validation environment 500 and an operational scenario in an implementation. The elements of validation environment 500 may be implemented in software, on a suitable computing device or devices, of which computing system 601 is representative. Validation environment 500 includes traffic manager 501, controller 503, service 505, and service 515. Validation environment 500 may also include an external service 509.

In operation, request traffic is received into traffic manager 501. The request traffic may originate from end-user devices, intermediate systems (such as other application services), or elsewhere, and are directed to service 505 to request information, action, or some other aspect of a service. Service 505 may be considered a previous version of a service relative to service 515, which is the new version of the service. Traffic manager duplicates the traffic and sends the duplicate stream to service 515.

Service 505 and service 515 proceed to process the traffic in parallel. Service 505 may perform read operations, write operations, or both, with respect to data 507. Data 507 is a base copy of data used to support the service. In the background, data 507 is synchronized with data 517. To synchronize, the state changes that occur with respect to data 307 are copied to data 517 to update its state.

Service 515 may perform read operations with respect to data 517, which is a copy of data 507. However, when attempting to write to data 517, service 515 instead communicates with emulator 516. Emulator 516 presents an emulated version of data 517 to service 515 for write purposes. Data is written to file 518 or any temporary data structure.

Service 505 communicates its validated service responses to controller 503, while service 515 also communicates its (non-validated) service responses to controller 503. Controller 503 then evaluates the responses to determine whether or not to validate one or more portions of service 515. The expected service responses may be communicated by controller 503 back to the source of the traffic requests. Optionally, service 505 may communicate the service responses to the source. The responses may optionally be returned through traffic manager 501.

In some scenarios, the request traffic may prompt service 505 to perform external operations with external service 509. External service 509 may be, for example, a key service that manages keys for a license service. For such requests, service 515 communicates with emulator 519. Emulator 519 provides an emulated version of external service 509 to service 515. Service 505 may generate expected replies after communicating with external service 509, while service 515 may generate non-validated replies. The expected and non-validated replies can be evaluated by controller 503 to determine whether to validate those portions of the new service associated with external service 509.

In one specific scenario, a shadowing implementation may involve a legacy version of a service and a modern version running side by side with the same customer data. The results of the original legacy API (application program interface) requests may be compared to their ported modern versions. Specifically, for APIs that modify the customer state in the service and/or obtain external non-deterministic data, a validation service compares API behavior but at the same time prevents the modern service from making customer state changes or affecting external services and their state.

In this scenario, the legacy service is the source of truth for customer data. It serves all production traffic and modifies its internal state as necessary. The modern service shadows the legacy service: all traffic is routed into both services, but processing in the modern service does not affect customer state. Instead the request results are compared between legacy and modern services. Any discrepancies may be investigated and typically result in errors being fixed in the modern service to ensure correctness of the port.

To accomplish this, the legacy service uses a data synchronizer that copies all customer state into the modern service, thus ensuring there is one consistent source of truth. The modern services uses data storage emulators for the cases when it needs to modify internal state or obtains non-deterministic data from external sources. This allows the API code to execute as it would normally do, but to not introduce changes to the actual shadow environment. It ensures that the data across versions does not diverge and the legacy service remains the source of truth.

In operation, the legacy service processes all customer requests, maintains customer state (as the source of truth) and provides all service responses. The modern service mimics the legacy service behavior by exposing the same service endpoint and APIs. Its customer state is a copy of the data from Legacy service.

A common service endpoint, to which all customer requests are directed, redirects requests to both services in parallel. It then compares the output of both services and logs any discrepancies which are later investigated. The modern service is expected to return exactly the same responses as the legacy service for each request.

In some scenarios, the services are stateful in that they constantly add and modify customer data. They also rely on external stateful services, some of which return revenue impacting data for each request. It is therefore beneficial to prevent the modern service, shadowing the legacy service, from introducing its own changes to its state (which should remain a copy of the original state from legacy service) as well as from impacting external services.

Accordingly all read operations in the modern service are allowed to happen against its customer data store. However, all write operations are redirected to an emulator component. Modern service APIs believe they are modifying state in the data store, however in reality they are modifying a temporary representation of the customer state. This allows the API code to correctly exercise the business logic and its output can later be compared to what the equivalent legacy API generated.

In a similar manner when a modern API is interacting with an external stateful service, it is redirected to an emulator. API code believes it is obtaining data from an external service, but in fact it is not affecting that services at all.

A response validation component is responsible for comparing service responses. It is aware of the fact that modern services uses emulators and can handle expected differences in responses that were caused by the emulated data being used. It also classifies any discrepancies so engineers can prioritize the suspicious differences for investigation.

Data from response validation is used to correct errors in the modern service. After changes are made, the modern service is re-deployed and another round of validation is done until complete parity is reached between the services. At this point the legacy service may be disabled and the modern service may take over.

A technical effect that may be appreciated from the present disclosure is that the use of an emulator in the modern service allows one consistent source of truth (customer data in the legacy service) to be maintained, while at the same time exercising the same business logic in two independent service implementations. The emulator also solves the problem of data changing in the modern service which would be require state to be resolved/merged between the two services. Instead, a simple copy/import of state from the legacy service into the modern service can be performed.

FIG. 6 illustrates computing system 601 that is representative of any system or collection of systems in which the various applications, services, scenarios, and processes disclosed herein may be implemented. Examples of computing system 601 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 601 may be implemented as a single apparatus, system, or device or may be implemented in a distributed manner as multiple apparatuses, systems, or devices. Computing system 601 includes, but is not limited to, processing system 602, storage system 603, software 605, communication interface system 607, and user interface system 609. Processing system 602 is operatively coupled with storage system 603, communication interface system 607, and user interface system 609.

Processing system 602 loads and executes software 605 from storage system 603. Software 605 includes validation process 606, which is representative of the validation processes discussed with respect to the preceding FIGS. 1-5, including validation process 200. When executed by processing system 602 to enhance service validation, software 605 directs processing system 602 to operate as described herein for at least the various processes, operational scenarios, and sequences discussed in the foregoing implementations. Computing system 601 may optionally include additional devices, features, or functionality not discussed for purposes of brevity.

Referring still to FIG. 6, processing system 602 may comprise a micro-processor and other circuitry that retrieves and executes software 605 from storage system 603. Processing system 602 may be implemented within a single processing device, but may also be distributed across multiple processing devices or sub-systems that cooperate in executing program instructions. Examples of processing system 602 include general purpose central processing units, application specific processors, and logic devices, as well as any other type of processing device, combinations, or variations thereof.

Storage system 603 may comprise any computer readable storage media readable by processing system 602 and capable of storing software 605. Storage system 603 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 603 may also include computer readable communication media over which at least some of software 605 may be communicated internally or externally. Storage system 603 may be implemented as a single storage device, but may also be implemented across multiple storage devices or sub-systems co-located or distributed relative to each other. Storage system 603 may comprise additional elements, such as a controller, capable of communicating with processing system 602 or possibly other systems.

Software 605 may be implemented in program instructions and among other functions may, when executed by processing system 602, direct processing system 602 to operate as described with respect to the various operational scenarios, sequences, and processes illustrated herein. For example, software 605 may include program instructions for implementing enhanced service validation.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 605 may include additional processes, programs, or components, such as operating system software, virtual machine software, or other application software, in addition to or that include validation process 606. Software 605 may also comprise firmware or some other form of machine-readable processing instructions executable by processing system 602.

In general, software 605 may, when loaded into processing system 602 and executed, transform a suitable apparatus, system, or device (of which computing system 601 is representative) overall from a general-purpose computing system into a special-purpose computing system customized to facilitate enhanced service validation. Indeed, encoding software 605 on storage system 603 may transform the physical structure of storage system 603. The specific transformation of the physical structure may depend on various factors in different implementations of this description. Examples of such factors may include, but are not limited to, the technology used to implement the storage media of storage system 603 and whether the computer-storage media are characterized as primary or secondary storage, as well as other factors.

For example, if the computer readable storage media are implemented as semiconductor-based memory, software 605 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 607 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 609 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 609. In some cases, the input and output devices may be combined in a single device, such as a display capable of displaying images and receiving touch gestures. The aforementioned user input and output devices are well known in the art and need not be discussed at length here.

User interface system 609 may also include associated user interface software executable by processing system 602 in support of the various user input and output devices discussed above. Separately or in conjunction with each other and other hardware and software elements, the user interface software and user interface devices may support a graphical user interface, a natural user interface, or any other type of user interface.

Communication between computing system 601 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Certain inventive aspects may be appreciated from the foregoing disclosure, of which the following are various examples.

EXAMPLE 1

A method for validating a new version of a service running in parallel with a previous version of the service, the method comprising: duplicating traffic that is inbound to the previous version of the service, for consumption in parallel by the new version of the service; in response to write operations that are prompted by the traffic, providing the previous version of the service with regular access to the data and providing the new version of the service with emulated write-access to the data; and evaluating non-validated replies to the traffic generated by the new version of the service against expected replies to the traffic generated by the previous version of the service to identify flaws in the new version of the service.

EXAMPLE 2

The method of Example 1 wherein the data comprises a base copy of the data accessed by the previous version of the service and a target copy of the data accessed the new version of the service, wherein the method further comprising synchronizing the target copy of the data with the base copy of the data.

EXAMPLE 3

The method of Examples 1-2 wherein synchronizing the target copy of the data with the base copy of the data comprises updating the target copy of the data with state changes that occur with respect to the base copy of the data.

EXAMPLE 4

The method of Examples 1-3 wherein providing the new version of the service with emulated write-access to the data comprises providing the new service with the emulated write-access to the target copy of the data.

EXAMPLE 5

The method of Examples 1-4 wherein, in response to read operations that are prompted by the traffic, providing the new service with non-emulated read access to the target copy of the data.

EXAMPLE 6

The method of Examples 1-5 wherein the write operations comprise write requests and wherein providing the new version of the service with the emulated write-access to the target copy of the data comprises responding to the write requests as if having written to the target copy of the data in response to the write requests, without actually writing to the target copy of the data.

EXAMPLE 7

The method of Examples 1-6 further comprising, in response to external operations prompted by at least a portion of the traffic, providing the previous version of the service with regular access to an external service and providing the new version of the service with emulated access to the external service.

EXAMPLE 8

The method of Examples 1-7 wherein the service comprises a licensing service and wherein the external service comprises a key service that provides license keys to the licensing service.

EXAMPLE 9

An apparatus for validating a new version of a service running in parallel with a previous version of the service, the apparatus comprising: one or more computer readable storage media; a processing system coupled with the one or more computer readable storage media; and program instructions stored on the one or more computer readable storage media that, when executed by the processing system, direct the processing system to at least: duplicate traffic that is inbound to the previous version of the service, for consumption in parallel by the new version of the service; in response to write operations that are prompted by the traffic, provide the previous version of the service with regular access to the data and provide the new version of the service with emulated write-access to the data; and evaluate non-validated replies to the traffic generated by the new version of the service against expected replies to the traffic generated by the previous version of the service to identify flaws in the new version of the service.

EXAMPLE 10

The apparatus of Example 9 wherein the data comprises a base copy of the data accessed by the previous version of the service and a target copy of the data accessed the new version of the service, wherein the program instructions further direct the processing system to synchronize the target copy of the data with the base copy of the data.

EXAMPLE 11

The apparatus of Examples 9-10 wherein to synchronize the target copy of the data with the base copy of the data, the program instructions direct the processing system to update the target copy of the data with state changes that occur with respect to the base copy of the data.

EXAMPLE 12

The apparatus of Examples 9-11 wherein to provide the new version of the service with emulated write-access to the data, the program instructions direct the processing system to provide the new service with the emulated write-access to the target copy of the data.

EXAMPLE 13

The apparatus of Examples 9-12 wherein, in response to read operations that are prompted by the traffic, the program instructions further direct the processing system to provide the new service with non-emulated read access to the target copy of the data.

EXAMPLE 14

The apparatus of Examples 9-13 wherein the write operations comprise write requests and wherein to provide the new version of the service with the emulated write-access to the target copy of the data, the program instructions direct the processing system to responding to the write requests as if having written to the target copy of the data in response to the write requests, without actually writing to the target copy of the data.

EXAMPLE 15

The apparatus of Examples 9-14 wherein the program instructions further direct the processing system to, in response to external operations prompted by at least a portion of the traffic, provide the previous version of the service with regular access to an external service and provide the new version of the service with emulated access to the external service.

EXAMPLE 16

The apparatus of Examples 9-15 wherein the service comprises a licensing service and wherein the external service comprises a key service that provides license keys to the licensing service.

EXAMPLE 17

A validation service for validating a new version of a service running in parallel with a previous version of the service, the validation service comprising: a traffic manager that duplicates traffic that is inbound to the previous version of the service, for consumption in parallel by the new version of the service; an emulator that, in response to write operations that are prompted by the traffic, provides the new version of the service with emulated write-access to the data; and a controller that evaluates non-validated replies to the traffic generated by the new version of the service against expected replies to the traffic generated by the previous version of the service to identify flaws in the new version of the service.

EXAMPLE 18

The validation service of Example 17 wherein the data comprises a base copy of the data accessed by the previous version of the service and a target copy of the data accessed the new version of the service, wherein the validation service further comprises a synchronizer that synchronizes the target copy of the data with the base copy of the data by at least updating the target copy of the data with state changes that occur with respect to the base copy of the data.

EXAMPLE 19

The validation service of Examples 17-18 wherein to provide the new version of the service with emulated write-access to the data, the emulator provides the new service with the emulated write-access to the target copy of the data.

EXAMPLE 20

The validation service of Examples 17-19 further comprising an additional emulator that, in response to external operations prompted by at least a portion of the traffic, provides the new version of the service with emulated access to an external service, wherein the service comprises a licensing service and wherein the external service comprises a key service that provides license keys to the licensing service.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The invention claimed is:

1. A method for validating a new version of a service running in parallel with a previous version of the service, the method comprising:
   duplicating traffic that is inbound to the previous version of the service, for consumption in parallel by the new version of the service;
   in response to write operations that are prompted by the traffic, providing the previous version of the service with regular access to a base copy of the data and providing the new version of the service with emulated write-access to a target copy of the data, wherein the service comprises a licensing service and a portion of the traffic comprises one or more license keys to the licensing service, wherein the write operations comprise write requests and wherein providing the new version of the service with the emulated write-access comprises responding to the write requests as if having written to the target copy of the data in response to the write requests, without actually writing to the target copy of the data;
   evaluating non-validated replies to the traffic generated by the new version of the service against expected replies to the traffic generated by the previous version of the service to identify flaws in the new version of the service; and
   synchronizing state changes that occur with respect to the base copy of the data with the target copy of the data.

2. The method of claim 1 wherein synchronizing the state changes comprises copying the state changes that occur with respect to the base copy of the data to the target copy of the data.

3. The method of claim 1 wherein synchronizing the target copy of the data with the base copy of the data comprises updating the target copy of the data with state changes that occur with respect to the base copy of the data.

4. The method of claim 1 wherein, in response to read operations that are prompted by the traffic, providing the new version of the service with non-emulated read access to the target copy of the data.

5. The method of claim 1 further comprising, in response to external operations prompted by at least a portion of the traffic, providing the previous version of the service with regular access to an external service and providing the new version of the service with emulated access to the external service.

6. The method of claim 5 wherein the external service comprises a key service that provides license keys to the licensing service.

7. An apparatus for validating a new version of a service running in parallel with a previous version of the service, the apparatus comprising:
   one or more hardware computer readable storage media;
   a processing system coupled with the one or more hardware computer readable storage media; and
   program instructions stored on the one or more hardware computer readable storage media that, when executed by the processing system, direct the processing system to at least:
   duplicate traffic that is inbound to the previous version of the service, for consumption in parallel by the new version of the service;
   generate a base copy of data used to support the service via the previous version of the service;
   generate a target copy of the data used to support the service via the new version of the service;
   in response to write operations that are prompted by the traffic, provide the previous version of the service with regular access to the base copy of the data and provide the new version of the service with emulated write-access to the target copy of the data, wherein the service comprises a licensing service and a portion of the traffic comprises one or more license keys to the licensing service, and wherein the write operations comprise write requests and wherein providing the new version of the service with the emulated write-access comprises responding to the write requests as if having written to the target copy of the data in response to the write requests, without actually writing to the target copy of the data;
   evaluate non-validated replies to the traffic generated by the new version of the service against expected replies to the traffic generated by the previous version of the service to identify flaws in the new version of the service; and
   synchronize state changes that occur with respect to the base copy of the data with the target copy of the data.

8. The apparatus of claim 7 wherein to synchronize the state changes, the program instructions direct the processing system to copy the state changes that occur with respect to the base copy of the data to the target copy of the data.

9. The apparatus of claim 7 wherein to synchronize the target copy of the data with the base copy of the data, the program instructions direct the processing system to update the target copy of the data with state changes that occur with respect to the base copy of the data.

10. The apparatus of claim 7 wherein, in response to read operations that are prompted by the traffic, the program instructions further direct the processing system to provide the new version of the service with non-emulated read access to the target copy of the data.

11. The apparatus of claim 7 wherein the program instructions further direct the processing system to, in response to external operations prompted by at least a portion of the traffic, provide the previous version of the service with regular access to an external service and provide the new version of the service with emulated access to the external service.

12. The apparatus of claim 11 wherein the external service comprises a key service that provides license keys to the licensing service.

13. One or more non-transitory computer readable storage media having program instructions stored thereon for validating a new version of a service running in parallel with a previous version of the service, wherein the program instructions, when executed by a processing system, direct the processing system to at least:
   duplicate traffic that is inbound to the previous version of the service, for consumption in parallel by the new version of the service;
   in response to write operations that are prompted by the traffic, provide the previous version of the service with regular access to a base copy of the data and provide the new version of the service with emulated write-access to a target copy of the data, wherein the service comprises a licensing service and a portion of the traffic comprises one or more license keys to the licensing service, wherein the write operations comprise write requests and wherein the providing the new version of the service with the emulated write-access comprises responding to the write requests as if having written to the target copy of the data in response to the write requests, without actually writing to the target copy of the data;
   evaluate non-validated replies to the traffic generated by the new version of the service against expected replies to the traffic generated by the previous version of the service to identify flaws in the new version of the service; and
   synchronize state changes that occur with respect to the base copy of the data with the target copy of the data.

14. The one or more non-transitory computer readable storage media of claim 13 wherein to synchronize the state changes, the program instructions direct the processing system to update the target copy of the data with state changes that occur with respect to the base copy of the data.

15. The one or more non-transitory computer readable storage media of claim 13 wherein the program instructions further direct the processing system to, in response to external operations prompted by at least a portion of the traffic, provide the new version of the service with emulated access to an external service, wherein the external service comprises a key service that provides license keys to the licensing service.

* * * * *